United States Patent Office 3,171,638
Patented Mar. 2, 1965

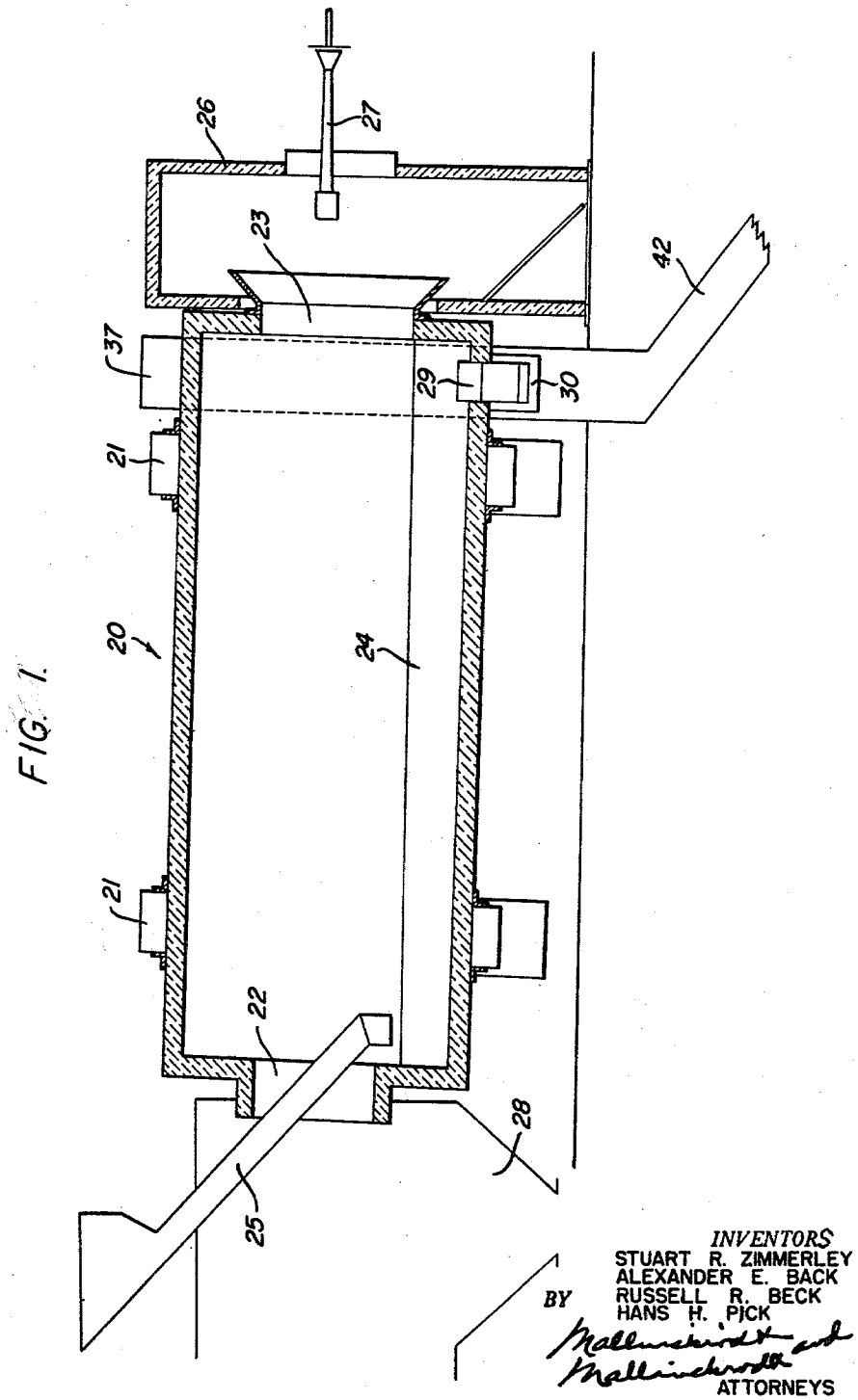

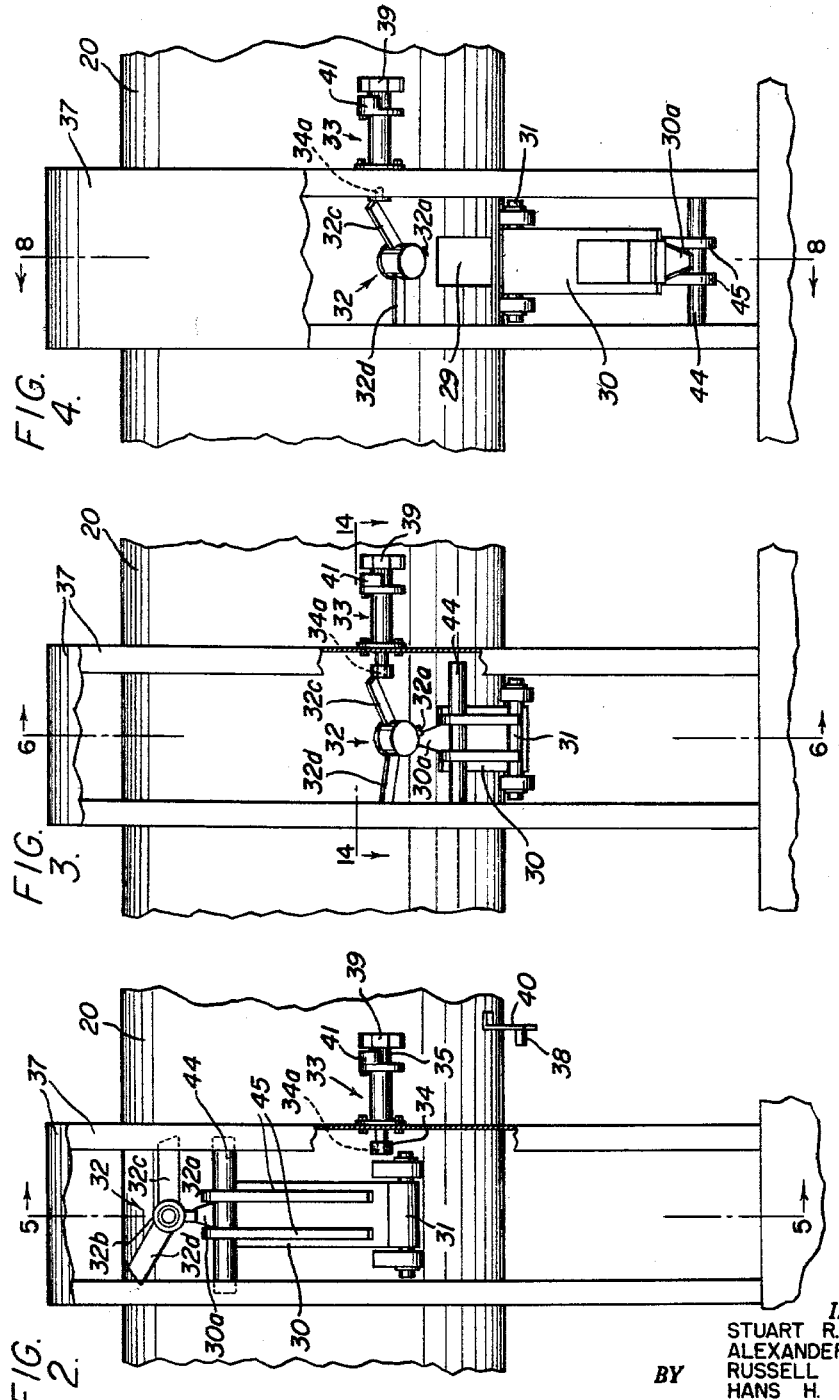

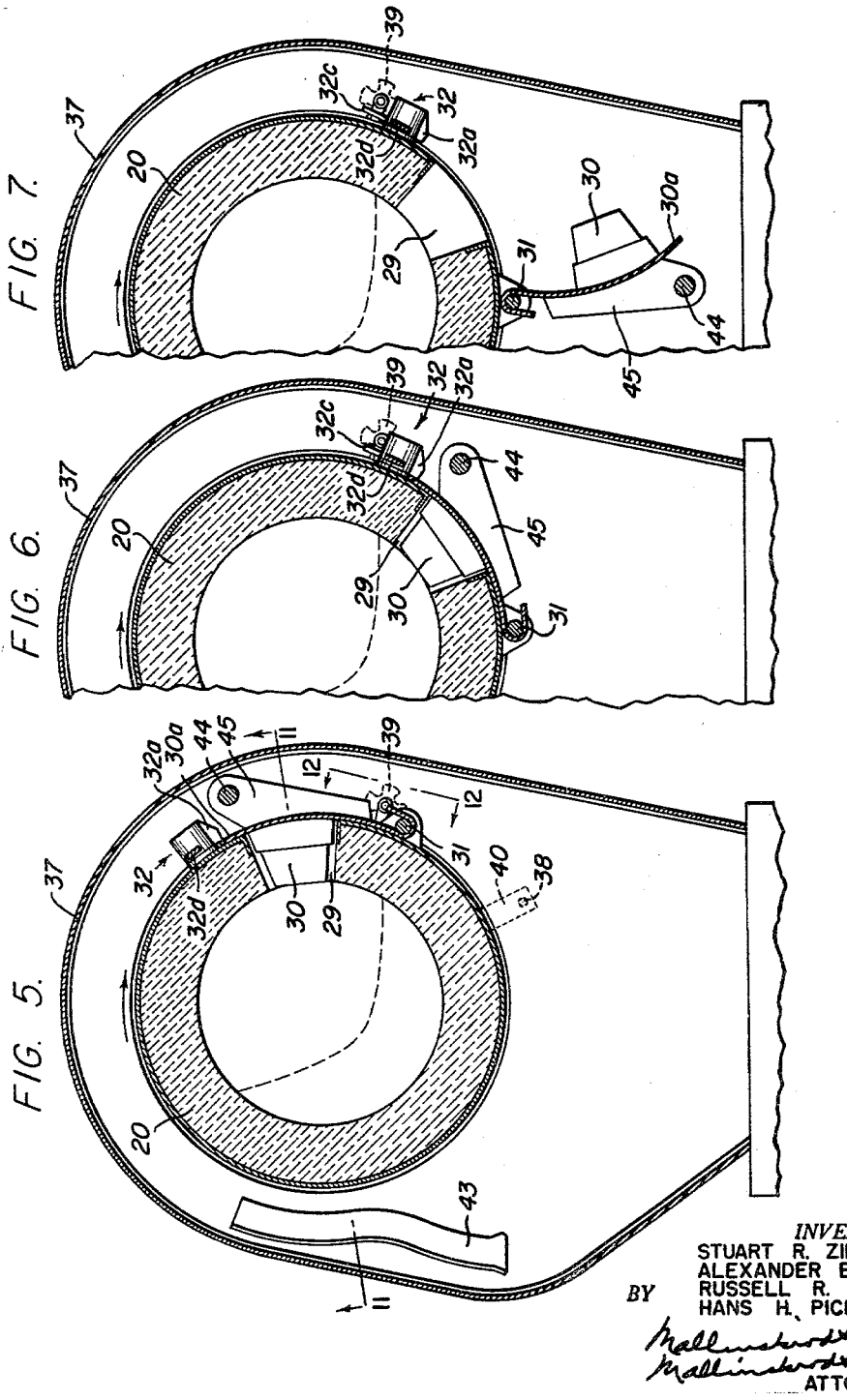

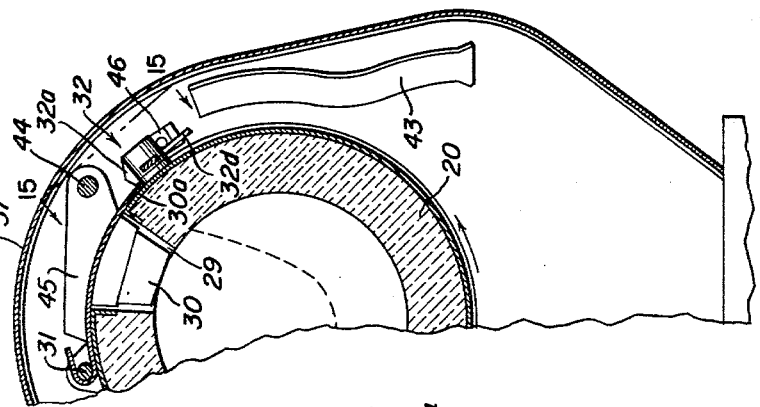
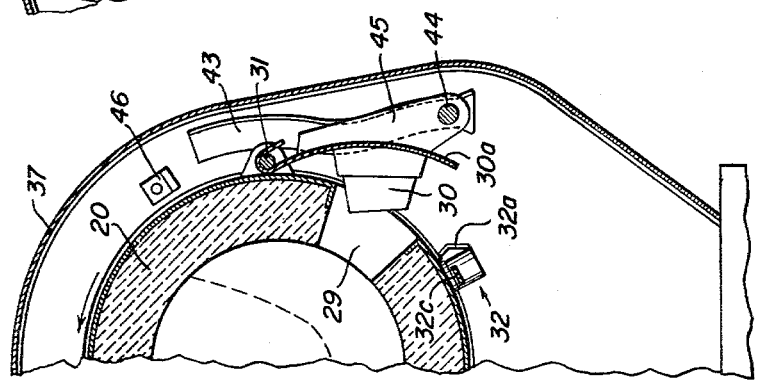
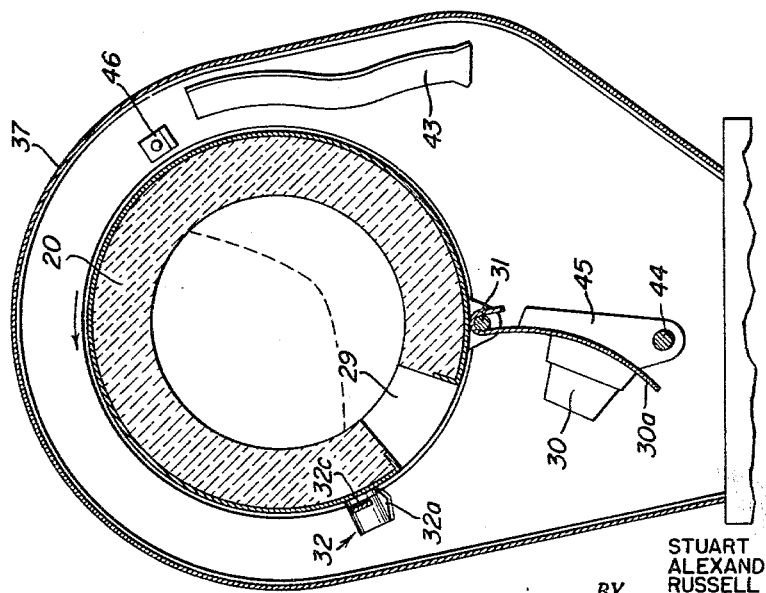

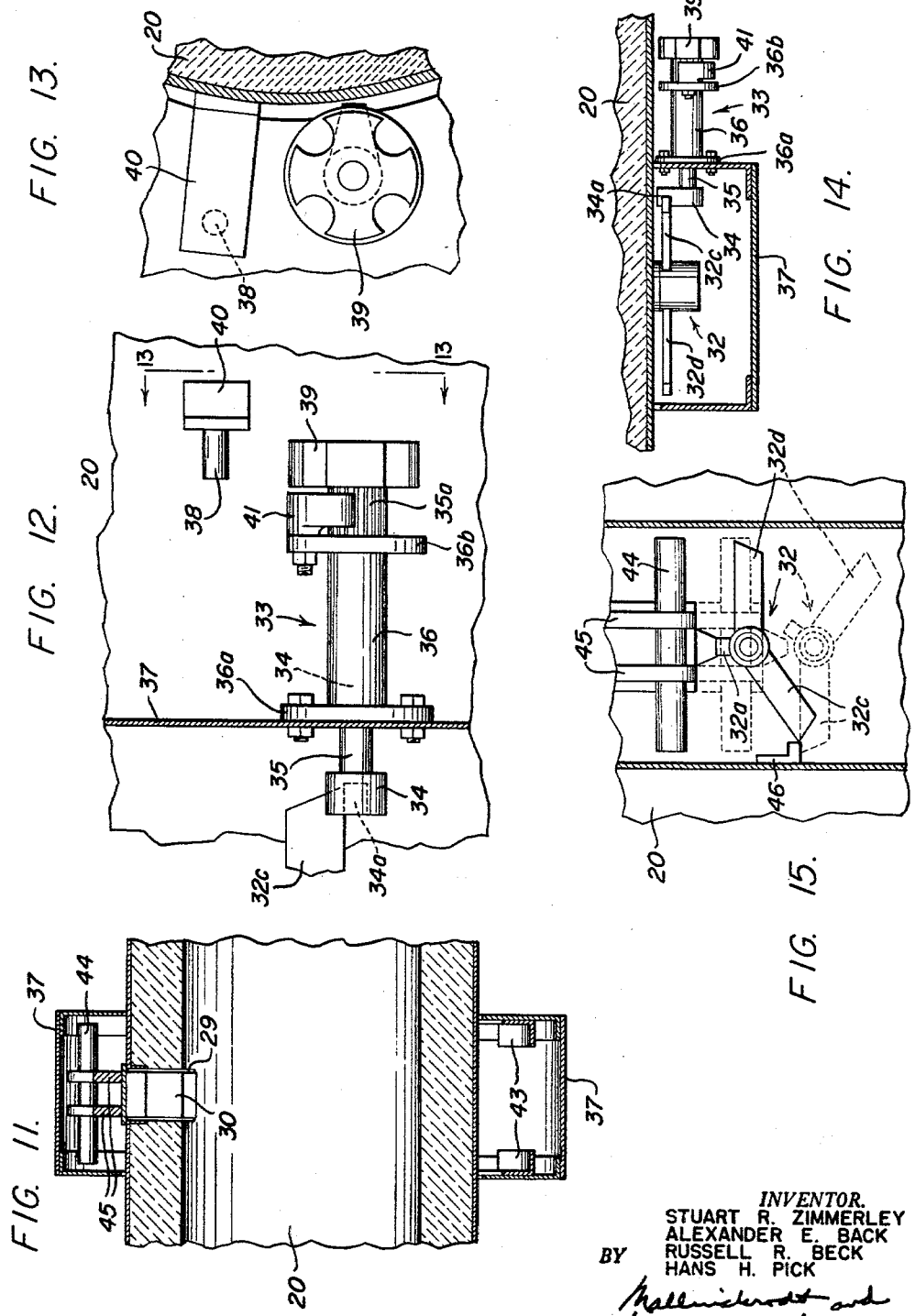

3,171,638
ROTARY FURNACE PRODUCTION OF
SPONGE IRON
Stuart R. Zimmerley, Alexander E. Back, Russell R. Beck, and Hans H. Pick, Salt Lake City, Utah, assignors to Kennecott Copper Corporation, New York, N.Y., a corporation of New York
Original application May 5, 1960, Ser. No. 27,168, now Patent No. 3,096,172, dated July 2, 1963. Divided and this application June 27, 1963, Ser. No. 291,176
4 Claims. (Cl. 263—33)

This invention relates to the production of sponge iron as carried out in a rotary furnace. It is concerned with both method and apparatus, the method being claimed in our similarly entitled, copending application Serial Number 27,168, filed May 5, 1960, now Patent No. 3,096,172, of which this application is a division.

A Bruckner type of rotary furnace is currently employed on an industrial basis for the production of sponge iron by the reduction of roasted pyrite concentrates. However, difficulties have been encountered in preventing excessive oxidation of the hot sponge iron as it is being discharged from the furnace.

A principal object of the invention is to provide a method of removing the sponge iron from the furnace with so little oxidation as to be negligible from a practical standpoint, and to provide apparatus for accomplishing the method automatically, the present application being directed to the apparatus.

Solid carbonaceous fuel is employed as a reductant for iron oxide in the roasted pyrite concentrates. The charged materials are heated in the furnace to around 1900° F., natural gas burners at one end of the furnace being directed into its interior above and toward the bed of charged materials for the purpose. The atmosphere above the bed is oxidizing, in order to attain the high temperature required for the reaction. However, excess carbon monoxide generated in the charged materials by the reaction of hot coke and carbon dioxide rises to the surface of the bed and burns, forming a protective blanket which prevents oxidation of the spongy, metallic iron particles constituting the reaction product. Heretofore, the sponge iron product has been discharged from the furnace in the form of a trickling stream of discrete particles passing over a circular discharge lip in an end wall of the furnace and falling freely through a discharge hood and chute. Despite precautions, extensive oxidation has occurred.

The method of this invention involves periodically dropping a batch of the sponge iron particles, as a substantially compact, carbon monoxide generating entity, from the bottom of the bed and, desirably, from below the protective blanket of burning carbon monoxide as the furnace rotates, thereby practically eliminating oxidation of the discharged product by reason of continued surface blanketing by burning carbon monoxide.

While the method may be carried out by manually opening and closing a discharge door provided in the cylindrical wall of the furnace near the discharge end thereof, it being realized that the furnace normally rotates at a speed of only one revolution per minute it is preferred to utilize the apparatus of the invention. This enables the method to be performed automatically.

The apparatus involves improvements in the conventional Bruckner type of rotary furnace. A discharge opening and door therefor are provided in the cylindrical wall of the furnace shell adjacent to the firing end, together with a latch for normally maintaining the door in closed position. Means are provided for unlatching the door within the lower portion of the rotative path of the furnace shell upon predetermined multiple rotations of the shell, whereby the door is permitted to swing open under the influence of gravity. Other means are provided for closing and re-latching the door following each discharge.

Apparatus representing what is presently regarded as the best mode of carrying out the invention is illustrated in the accompanying drawings.

In the drawings:

FIG. 1 represents a schematic axial vertical section of a Bruckner furnace embodying the invention, the view being taken during discharge to show the normally closed discharge door in its fully open position;

FIG. 2, a fragmentary elevation with hood covering stripped off, the view being drawn to an enlarged scale and taken at a stage of furnace rotation when the discharge door is latched closed but is advancing downwardly toward door-unlatching mechanism;

FIG. 3, a similar view taken at a later stage when the door is almost unlatched;

FIG. 4, a similar view taken at the still later stage of FIG. 1 when the discharge door is unlatched and fully open;

FIG. 5, a transverse vertical section taken on the line 5—5 of FIG. 2;

FIG. 6, a similar though fragmentary view taken at a stage corresponding to that of FIG. 3;

FIG. 7, a view similar to that of FIG. 6, but taken at a stage corresponding to that of FIG. 4;

FIG. 8, a transverse vertical section taken on the line 8—8 of FIG. 4;

FIG. 9, a similar view taken at a later stage of furnace rotation when the door is about to be closed automatically;

FIG. 10, a view similar to that of FIG. 9, but taken at a still later stage when the door has been closed and re-latched;

FIG. 11, a fragmentary horizontal section taken on the line 11—11 of FIG. 5;

FIG. 12, a fragmentary, vertical, longitudinal section taken on the line 12—12 of FIG. 5 and drawn to an enlarged scale;

FIG. 13, a fragmentary, vertical transverse section taken on the line 13—13 of FIG. 12;

FIG. 14, a fragmentary, vertical, longitudinal section taken on the line 14—14 of FIG. 3 and drawn to the enlarged scale of FIGS. 12 and 13; and FIG. 15, a fragmentary, longitudinal section taken on the line 15—15 of FIG. 10 and drawn to the enlarged scale of FIGS. 12–14, an immediately previous position of latch 32 being indicated by broken lines.

Referring to the drawings:

In the illustrated embodiment of the invention, the Bruckner type of rotary furnace comprises a refractory-lined, cylindrical shell 20 mounted for rotation in customary manner on trunnions 21. Such shell 20 is provided with the usual annular end walls, which define an axially located feed opening 22 and opposing firing opening 23 and which serve as dams for maintaining a deep bed 24 of charged material within the lower portion of the shell as it rotates. The shell is sloped slightly, ordinarily one degree, along its longitudinal axis from feed end to firing end, as is customary, to insure advancement of the charged material toward such firing end.

Charging of the furnace is accomplished in customary manner through a feed pipe or chute 25 and firing is effected through a usual firing hood 26 by means of a gas burner 27. The flames travel immediately above and counter to the bed 24 in an oxidizing atmosphere. Products of combustion pass out through a usual flue 28.

As mentioned earlier, carbon monoxide gas is generated in the charged materials as they are heated to reducing temperature and rises through the bed and ignites at the surface thereof to form a protective blanket of burning carbon monoxide, which effectively prevents oxidation of the resulting sponge iron. Thus, the sponge iron travels toward the opening 23 without contact with an oxidizing atmosphere.

Discharge of the sponge iron in a thin, trickling stream over the annular lip or dam which defines opening 23, as has been done heretofore, would result in oxidation of a large proportion of the product and would seriously reduce the efficiency of metallurgical operations in which the sponge iron is employed.

In order to permit practice of the method of this invention, a relatively small discharge opening 29 is formed through the cylindrical wall of furnace shell 20 near the firing end. A gravity-opening door 30, hinged at 31 in this instance to swing open and closed, normally closes opening 29 to prevent material discharge. The size of opening 29 will depend upon the overall size of the furnace shell and upon particular processing conditions in each instance, but such opening is preferably either square or circular so as to drop batches of minimum surface area.

In some instances it may be desirable to secure one or more bars (not shown) across discharge opening 29 to serve, in effect, as a grating for screening out extra large accretions of sponge iron which may form during the processing of the charged materials within furnace shell 20. Ordinarily, this will not unduly disturb the continuity of the batch being discharged.

Utilizing a typical Bruckner furnace having a 10 by 30 foot furnace shell which rotates at one r.p.m. and has a production rate of forty to fifty pounds of finished product per minute, a discharge opening one foot square will be satisfactory on the basis of opening the door once every four minutes for a duration of six seconds to discharge a batch of approximately 200 pounds of the product.

In the illustrated form of the apparatus, designed to effect periodic discharges automatically, discharge door 30 is normally latched in its closed position by means of a latch 32, FIGS. 2–4, pivotally mounted on shell 20 at the end of opening 23 and of door 30 opposite to that at which hinge 31 is located. This latch has a latch finger 32a that serves as a keeper for a latch member 30a projecting from door 30 in fixed relationship therewith. Latch finger 32a extends from a hub 32b, from which also extends a pair of trip arms 32c and 32d in mutually opposite directions, for alternately releasing and re-latching latch member 30a so discharge door 30 may fall open and again be securely latched in place, respectively, as the furnace shell 20 rotates.

This alternate release and re-latching of discharge door 30 takes place in the lower portion of the rotative path of the furnace shell, so that the door will fall open and processed material from bed 24 will drop out by gravity. Though the door is opened at the lowermost points of its rotational path in this illustrated form of the apparatus, the point of opening may be advantageously established at a higher level within the lower quadrant in which it rises, thereby taking advantage of thicker portions of the bed 24 of cascading material to prevent break-through to the upper, protectively blanketed surface of the bed during discharge. Nevertheless, discharge may be made to occur at any location within the lower portion of the rotative path of the furnace shell where the bed is sufficiently thick to effect a proper batch discharge.

In the present instance, the apparatus is designed to effect discharge on the fourth revolution of the furnace shell in each cycle consisting of four successive revolutions.

The particular means employed for timing the periodic discharges in this illustrated form of apparatus comprises a rotary tripper 33 constructed and arranged to be advanced in steps by successive rotations of the furnace shell 20, so that a tripping lug 34a comes into position to trip the arm 32c every fourth revolution of such furnace shell. Tripping lug 34a, see particularly FIGS. 12 and 14, projects laterally from a hub 34 fixed to one end of a shaft 35, which is rotatable in a sleeve 36.

A hood 37 forms a protective enclosure about that circumferential portion of furnace shell 20 occupied by discharge door 30. Sleeve 36 is securely fastened to a side wall of hood 37, as by means of bolting through an end flange 36a, shaft 35 extending through a suitable receiving aperture in such side wall so that tripping lug 34a is disposed within the hood in a circular path of travel which intersects the circular path of travel of trip arm 32c in the latching position of latch finger 32a, see FIGS. 2–4.

Shaft 35 is rotated intermittently by means of a pin 38 engaging a tooth of a timing gear 39 fixed to the opposite end of shaft 35 outside hood 37. Pin 38 projects from a bracket 40 fixed to the cylindrical wall of furnace shell 20 and rotates with such furnace shell. Timing gear 39 is positioned in the path of rotation of pin 38, FIG. 2, so as to be engaged thereby and turned from tooth to tooth by successive rotations of the furnace shell. The number of teeth in the timing gear determines the number of rotations of the furnace shell required to bring tripping lug 34a from trip position in one discharge cycle of the furnace to trip position in the next discharge cycle.

It is preferred to make the timing gear removable and replaceable and the pin correspondingly adjustable in position so that a given furnace can be changed in the duration of its discharge cycle to fit changed conditions of operation.

So that tripper 33 will be precise in its timing function, a pawl 41, FIG. 12, is pivotally mounted on an opposite end flange 36b of sleeve 36 to overhang a toothed section 35a of shaft 35 and function therewith as a ratchet.

While the above-described mechanism constitutes the presently preferred means for controlling and timing the discharge cycle of the apparatus, it will be realized that other means are available or may be adapted for the purpose and can be employed where circumstances warrant.

It has been found that the opening of discharge door 30 in the manner described as furnace shell 20 rotates effects discharge of respective batches of the finished product from the bottom of bed 24 without subjecting the remainder of the bed nor the batches to excessive oxidation. Fresh surfaces exposed during the discharging operation are apparently themselves blanketed with burning carbon monoxide. This is so because the carbon monoxide generating reaction is still going on within the bed and within the bulk of the discharged batch. Each batch drops as a carbon monoxide generating entity, made up of compactly grouped, sponge iron particles, into hood 37 and out discharge pipe 42, FIG. 1, to the usual cooling equipment (not shown). Oxidation during transit is at a minimum, not only because carbon monoxide from within the batch escapes to the surfaces and burns thereat, enveloping the batch with its own protective blanket, but also because the massed particles tend to exclude air during their descent to the cooler.

Re-closing of door 30 is accomplished automatically as it ascends from the point of opening, see FIGS. 8–10. For this purpose, cam tracks 43 are provided at opposite sides of but within hood 37 for engaging opposite ends, respectively, of a closing bar 44 carried by and projecting laterally from the free end of door 30. For placing bar 44 properly with respect to tracks 43, outwardly projecting, bar-mounting members 45 are rigidly secured to the outer face of door 30.

Cam tracks 43 act on closing bar 44 to force discharge door 30 tightly into closed position within and over discharge opening 29, see particularly FIG. 10, whereupon trip arm 32d of latch 32 strikes tripper lug 46 and forces latch finger 32a into latching position over latch member 30a. Tripper lug 46 is secured to and projects from hood 37 at an appropriate location beyond cam tracks 43 for this purpose.

Comparative tests made in a pilot plant utilizing a small version of a Bruckner furnace gave the following results:

| Test Number | Rate of Discharge, Pounds per Cycle | Analysis, Percent | | Reduction, Percent | Oxidation of Metallic Fe, Percent |
|---|---|---|---|---|---|
| | | Total Fe | Metallic Fe | | |
| A | [1] 14.6 | 79.6 | 68.0 | 85.4 | 0.0 |
| Control | [2] | 79.4 | 67.8 | 85.4 | |
| B | [1] 14.7 | 77.2 | 66.2 | 85.8 | 2.4 |
| Control | [2] | 76.1 | 66.8 | 87.8 | |
| C | [1] 8.8 | 75.8 | 60.0 | 79.2 | 1.5 |
| Control | [2] | 74.6 | 60.0 | 80.5 | |
| D | [1] 6.0 | 76.0 | 59.2 | 78.9 | 2.0 |
| Control | [2] | 74.8 | 60.2 | 80.5 | |
| E | [3] 3.5 | 74.0 | 52.5 | 71.0 | 11.5 |
| Control | [2] | 75.2 | 60.3 | 80.3 | |
| F | [3] 2.2 | 70.2 | 35.5 | 50.6 | 24.0 |
| Control | [2] | 72.1 | 48.0 | 66.6 | |

[1] Average weight of a single instantaneous discharge in accordance with the invention.
[2] Dip sample removed under reducing conditions.
[3] Conventional trickle discharge, pounds sponge iron per minute.

The data given in the table show that reoxidation of the metallic iron in tests A, B, C, and D is considerably and significantly less than in tests E and F. These data show the advantage of the peripheral batch discharge procedure over the conventional trickle discharge procedure practiced presently in the commercial installation.

Both the method and apparatus of this invention may be applied to the reduction of other forms of iron-bearing material such as magnetite, hematite, and mill scale, and to other reduction processes carried out in a rotary kiln, for example the reduction of chromite to an acid soluble compound and the reduction of pyrolusite to manganous oxide.

Whereas there is here illustrated and described a certain preferred construction of apparatus which we presently regard as the best mode of carrying out our invention, it should be understood that various changes may be made without departing from the inventive concepts particularly pointed out and distinctly claimed herebelow.

We claim:

1. In a rotary furnace for the carrying out of a reduction process, which furnace includes a cylindrical shell defining a processing chamber and having an end wall at the discharge end thereof; means mounting the shell for rotation on a substantially horizontal axis; means for rotating the shell about said axis; means for introducing raw material into the shell so that it forms a cascading bed of material therein; and means for firing the furnace, the improvement comprising means defining a discharge opening in the cylindrical wall of the shell within the zone comprehended by said cylindrical shell inwardly of said chamber from, but adjacent to, said end wall; a door hinged to the shell and normally closing said opening; means normally latching the door in its closed position; means operable to unlatch the door upon predetermined multiple rotation of the shell so that it will open by gravity; means for closing the door during the rotation of the shell immediately following its opening; and means for re-latching the closed door.

2. In a rotary furnace for the carrying out of a reduction process, which furnace includes a cylindrical shell defining a processing chamber and having an end wall at the discharge end thereof; means mounting the shell for rotation on a substantially horizontal axis; means for rotating the shell about said axis; means for introducing raw material into the shell so that it forms a cascading bed of material therein; and means for firing the furnace, the improvement comprising means defining a discharge opening in the cylindrical wall of the shell within the zone comprehended by said cylindrical shell inwardly of said chamber from, but adjacent to, said end wall; a door hinged to the shell and normally closing said opening; door latching means comprising a rotatable latch serving as a keeper with respect to the door; door unlatching means comprising a trip arm extending rigidly from one lateral side of said latch, and a tripper cam having a stationary mounting relative to the furnace shell and movable into and out of trip position relative to the trip arm so as to periodically throw the latch to unlatched position as the furnace shell rotates; timing means for periodically moving said cam into and out of trip position; means for closing the door at the predetermined time interval following its opening; and door re-latching means comprising a second trip arm extending rigidly from the opposite lateral side of said latch, and a second tripper cam having a stationary mounting relative to the furnace shell and being disposed in trip position relative to said second trip arm.

3. The improvement set forth in claim 2, wherein the first tripper cam is mounted for rotation into and out of trip position; and wherein the timing means comprises a timing gear mounted in driving relationship with said first tripper cam, and a drive pin for the timing gear rigidly affixed to the furnace shell so as to intermittently engage and turn said gear as said shell rotates.

4. The improvement set forth in claim 3, wherein a stationary hood encompasses that portion of the furnace shell in which the door is located; a shaft extends through and is journaled in a wall of said hood; the first tripper cam is fixed to the inner end of the shaft; and the timing gear is fixed to the outer end of the shaft.

References Cited by the Examiner

UNITED STATES PATENTS

| 644,057 | 2/00 | Carman | 263—33 |
| 1,415,990 | 5/22 | Carstens | 263—33 |
| 2,699,388 | 1/55 | Frick et al. | 263—33 XR |

CHARLES SUKALO, *Primary Examiner.*

JOHN J. CAMBY, *Examiner.*